United States Patent [19]

Klein

[11] Patent Number: 5,095,188
[45] Date of Patent: Mar. 10, 1992

[54] MANUFACTURE OF HIGH FREQUENCY HORNS

[75] Inventor: Kevin J. Klein, Roxbury, Conn.

[73] Assignee: Branson Ultrasonics Corporation, Danbury, Conn.

[21] Appl. No.: 558,232

[22] Filed: Jul. 26, 1990

[51] Int. Cl.$^5$ ............................................. B23K 15/00
[52] U.S. Cl. .......................... 219/121.14; 219/121.64; 228/1.1
[58] Field of Search ...................... 219/121.14, 121.64, 219/121.13, 121.63, 121.46, 121.45; 228/1.1; 333/187–189

[56] References Cited

U.S. PATENT DOCUMENTS

| | | | |
|---|---|---|---|
| 3,566,071 | 2/1971 | Matchett et al. | 219/121.14 |
| 3,949,186 | 4/1976 | Nakayama et al. | 219/121.14 |
| 4,227,065 | 10/1980 | Paradji et al. | 219/121.14 X |

*Primary Examiner*—C. L. Albritton
*Attorney, Agent, or Firm*—Polster, Lieder, Woodruff & Lucchesi

[57] ABSTRACT

A horn for coupling high frequency vibrations from an electroacoustic converter unit to a workpiece, such as is used for welding thermoplastic workpieces by ultrasonic vibrations, is constructed by machining sections of the horn and welding the sections together using electron beam welding or laser beam welding. The respective sections can be made from bar or plate stock.

This construction eliminates the machining of deep, inaccessible slots, and as most of the surfaces to be machined are accessible, a fine surface finish can be provided, thus eliminating tool marks which cause the existence of areas of high mechanical stress concentrations when the horn is rendered resonant. Also significant economic advantages are achieved when manufacturing large, massive slotted horns in this manner.

28 Claims, 3 Drawing Sheets

MANUFACTURE OF HIGH FREQUENCY HORNS

SUMMARY OF THE INVENTION

This invention relates to horns as used for welding thermoplastic parts by high frequency vibrations in the sonic or ultrasonic frequency range, and, more specifically, refers to the manufacture of such horns. Horns, known also as solid horns, concentrators, rods, tools, amplitude or velocity transformers, etc., see "Ultrasonic Engineering" (book) by Julian R. Frederick, pp. 87-103, John Willey & Sons, Inc., New York, NY, 1965, are used to couple vibratory energy in the sonic or ultrasonic frequency range from an electroacoustic converter to a workpiece to be welded. As larger workpieces are welded, requiring the transfer of energy of one kW or more, the horns generally made from titanium metal, aluminum or steel become increasingly larger and more massive. For a frequency of 20 kHz, rectangular bar horns may have a dimension ranging from 3 to 12 inches (8 to 30 cm) along each side by 5 to 5½ inches (12.7 to 14 cm) high. In order to provide efficient energy transfer from the converter unit, which is coupled to the input surface of the horn, to the output surface of the horn, which is in contact with the workpiece, horns of such dimension require the provision of longitudinal slots through the horn body, particularly through the nodal region, for interrupting Poisson couplings, i.e. vibrations propagated crosswise to the desired direction of energy transfer, see U.S. Pat. No. 3,113,225 entitled "Ultrasonic Vibration Generator, issued to C. Kleesattel et al, dated Dec. 3, 1963.

The machining or milling of deep slots through a massive metal block is slow, difficult to accomplish and expensive, and very frequently leaves tool marks and rough spots within the interior of the horn body. Such marks and spots cause locations of high mechanical stress concentration when the horn is rendered resonant, resulting frequently in the early fracture of the horn. Moreover, a typical titanium metal composition suitable for horns is not readily available in plate stock beyond four inches of thickness. Therefore, in order to obtain a larger solid block, a special cast must be produced with many thousand pounds minimum. As is well known, castings may have interior flaws and defects that are not normally present in rolled plate stock and, hence, give rise to additional problems.

Therefore, the instant invention discloses the manufacture of large size horns from more readily available bar or plate stock for providing individual horn sections. Such sections are then assembled in juxtaposed position and welded together by electron beam welding or laser beam welding to form a unitary structure. Several advantages will immediately become apparent. Because machining of individual sections is performed prior to welding, it is possible to modularize the horn, that is, machine sections in larger lots and then assemble the horn from prefabricated sections, thereby achieving maximum economics and efficiency.

Fabricating the horn from bar or plate stock provides flexibility and access to the interior surfaces of the horn. This accessibility makes it possible to provide a radius at the inside surfaces of the slots and to tune horn sections by banding or other acoustic techniques.

Slots can be machined into the horn sections using tools which are easier to control, thus achieving improved slot quality, better finish and dimensional accuracy, aside from lower tooling costs and a shorter machining time.

In summary then, the overall result of fabricating horns from individual sections which are welded together constitutes a significant cost reduction, improvement of the quality of the horn, and a technological advantage in that the completed horn is substantially free of internal stress concentration points and hidden defects.

One of the principal objects of this invention, therefore, is the provision of an improved horn construction, particularly horns of comparatively large size.

Another principal object of this invention is the provision of horn for welding parts in the sonic and ultrasonic frequency range which horns, while comparatively large in size, are substantially free from areas of internal stress concentration and defects.

Another principal object of this invention is the provision of horns which can be manufactured in a more economic manner.

A further object of this invention is the manufacture of horns from individually machined sections which are welded together to form a unitary body.

A further and other object of this invention is the manufacture of individual horn sections, assembling the sections in juxtaposed position and then welding the sections to one another.

A still further object of this invention is the manufacture of substantially large and massive horns by machining individual sections from plate stock, assembling a plurality of machined and slotted sections in juxtaposed position, welding the sections to one another, finishing the welded horn by machining one or more of the exposed surfaces, and fine tuning the assembled horn for the predetermined operating frequency.

Other and still further objects of this invention will be more clearly apparent when reading the following description in conjunction with the accompanying drawings.

DETAILED DESCRIPTION

Figure 1:
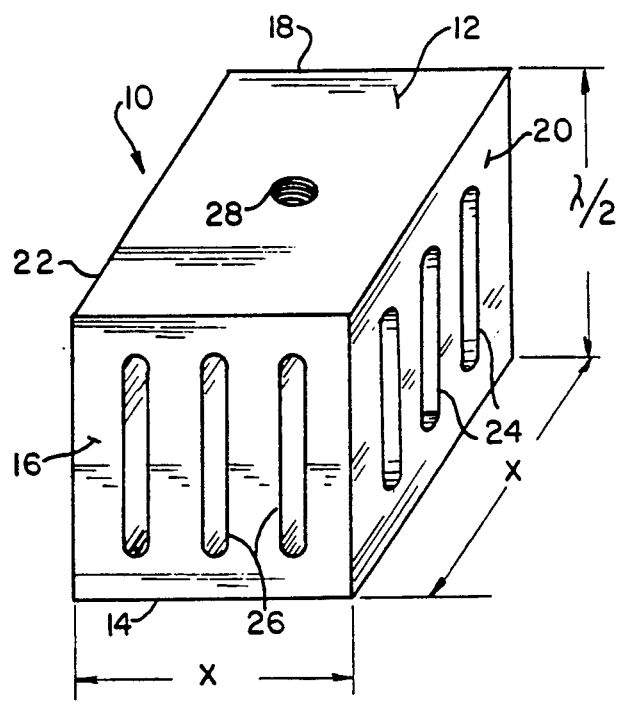
FIG. 1 is a perspective view of a typical horn used for welding large workpieces.
Figure 2:
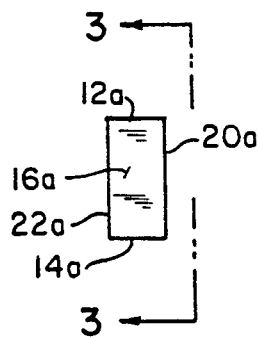
FIG. 2 is an end view of a typical raw plate stock metal bar prior to machining.
Figure 3:
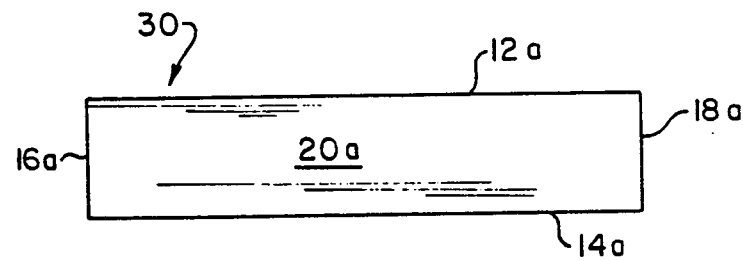
FIG. 3 is a side view along lines 3—3 of the bar shown in FIG. 2.

Referring now to the figures and FIG. 1 in particular, there is shown a horn 10 made typically from titanium metal, aluminum, or steel. Titanium is a preferred metal on account of its ability to be subjected to higher mechanical stress than steel or aluminum. For a typical operating frequency of 20 kHz, the dimension X may range from 3 to 12 inches (8 to 30 cm) while the height of the horn must correspond precisely to one half wavelength ($\lambda/2$) of the high frequency waves travelling longitudinally therethrough from the input surface 12 to the opposite output surface 14. At 20 kHz, this dimension is approximately 5 to $5\frac{1}{2}$ inches (12.7 to 14 cm) depending on the metal used.

The horn illustrated is a rectangular or square bar horn having an input surface 12 for receiving thereat high frequency vibrations from an electroacoustic converter unit, not shown, an output surface 14 for transmitting such vibrations to a workpiece in forced contact with the horn, two opposite end surfaces 16 and 18 and two opposite side surfaces 20 and 22. The horn 10 is provided with a plurality of slots which traverse the horn body, namely a first plurality of slots 24 which traverse the horn body from side surface 20 to side surface 22, and a second plurality of slots 26 which traverse the horn 10 from the end surface 16 to the end surface 18. The purpose of the slots, as stated above, is to interrupt Poisson couplings. The horn also includes a threaded hole 28 for receiving a threaded stud for coupling an electroacoustic converter to the input surface 12 of the horn 10.

In the past, the horn 10 was machined from a solid block and the slots 24 and 26 had to be milled or otherwise machined by cutting through the rather massive block of metal. It will be apparent that such a cutting operation is difficult and time consuming. In addition, the tool cutting through the interior of such a metal block leaves rough spots, chatter marks, etc., thereby creating locations of high mechanical stress concentration when the horn is rendered resonant which condition, in turn, would lead to a premature fracture of the horn. In addition, the procurement of a massive titanium metal block, as stated above, is difficult and expensive, and if the block is a casting, hidden internal defects may be present. The present invention is directed to assemble a horn as shown from individually machined bar stock sections.

Referring now to FIGS. 3 through 12 and FIGS. 2 and 3 in particular, there is shown an elongated rectangular plate or bar 30 having two end surfaces 16a and 18a, two side surfaces 20a and 22a and a top surface 12a which becomes a part of the input surface 12, and a bottom surface 14a which later becomes a part of the output surface 14. It should be understood that at a later state of the assembly, the surfaces 12a and 14a may require machining in order to accurately adjust the distance between the surfaces 12a and 14a for corresponding precisely to one half wavelength of the sound wave travelling longitudinally therethrough from the input surface 12 to the output surface 14, see FIG. 1. This is known as the tuning process well understood by those skilled in the art.

Figure 4:
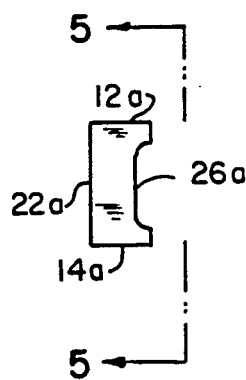
FIG. 4 is an end view, similar to FIG. 2, of the bar machined for providing horn end sections.
Figure 5:
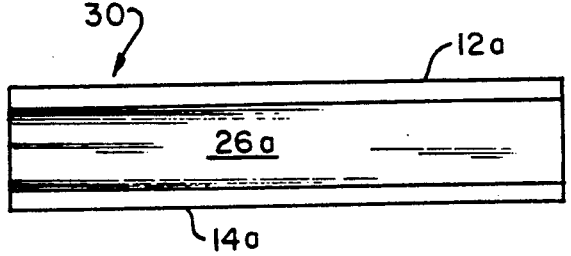
FIG. 5 is a side view along lines 5—5 of the bar shown in FIG. 4.

FIGS. 4 and 5 illustrate the step of machining the bar 30 for providing end sections of the horn 10. A flat recessed portion 26a is machined into the side 20a with a half rounded radius at the top and at the bottom. The recessed portion 26a actually comprises, what may be termed, a "half slot" of slot 26 and when juxtaposed with a central section, machined similarly, a complete slot 26, see FIG. 1, is formed.

Figure 6:
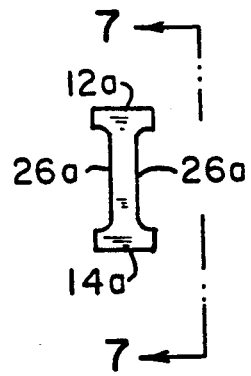
FIG. 6 is an end view showing a bar similar to the bar in FIG. 2, but machined for providing horn center sections.
Figure 7:
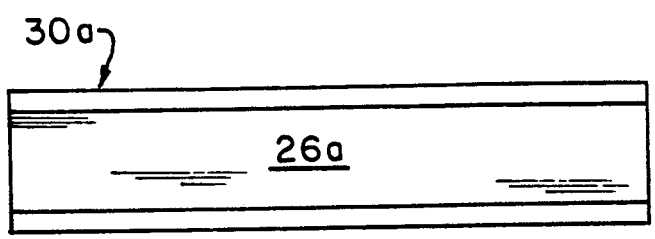
FIG. 7 is a side view of the bar along lines 7—7 in FIG. 6.

FIGS. 6 and 7 show the machining of a central section using a rectangular bar stock 30a, same as bar stock 30, but providing a recessed portion 26a in both side surfaces, see FIG. 6. Again, each recessed portion is machined to form a "half slot 26" and for forming a complete slot with a juxtaposed, similarly machined, bar stock section. It will be noted that an outer horn section 30 has a recess 26a machined only in one side surface, whereas a central horn section 30a has a recess 26a machined in both side surfaces.

The recesses 26a can be machined rather simply using conventional milling or honing tools and, since the entire surface of the recessed portion 26a is exposed, such surface can be provided with a fine and smooth finish, eliminating rough spots always present when milling slots with end milling tools along deep and inaccessible recesses.

Figure 8:
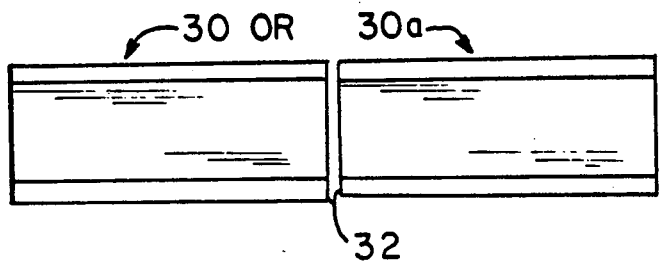
FIG. 8 is a side view of a plate stock bar, either per FIGS. 4 and 5 or 6 and 7 and illustrates cutting the bar to provide a plurality of individual horn sections.

Referring now to FIG. 8, which illustrates merely the cutting of the bar 30, an end horn portion, or a bar 30a, a central horn portion, into a plurality of sections of the required length by a suitable cross cut 32 to yield respective horn sections 10a or 10b as will be shown in FIGS. 9 and 10, and 11 and 12 respectively.

Figure 9:
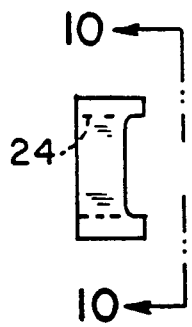
FIG. 9 is an end view of a horn end section provided with milled slots through its thickness.
Figure 10:
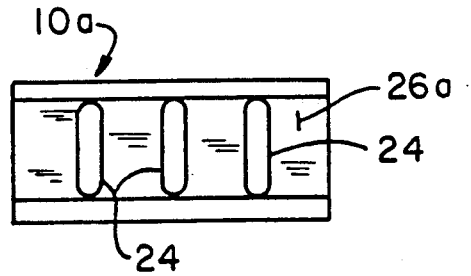
FIG. 10 is a side view along lines 10—10 in FIG. 9.
Figure 11:
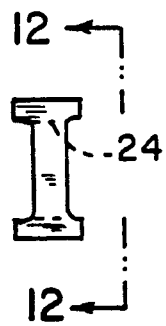
FIG. 11 is an end view of a horn center section with milled slots through its thickness.
Figure 12:
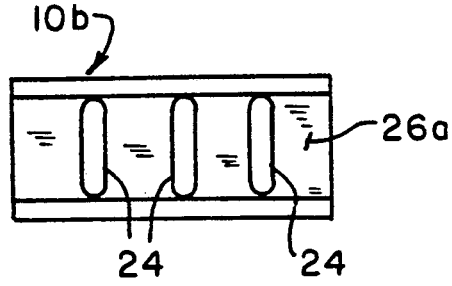
FIG. 12 is a side view along lines 12—12 in FIG. 11.

With reference to FIGS. 9 and 10, an end horn section 10a still requires the milling of cross slots 24. Since the section 10A is relatively thin when compared to the prior construction of the horn seen in FIG. 1, the slots can be milled rather quickly and a radius, if desired, can be provided at the area where the slots break through the side surfaces of the horn. The same process is applied to the center section 10b, providing the slots 24 through thickness of the particular bar section and providing, moreover, a smooth finish along all surfaces.

Figure 13:
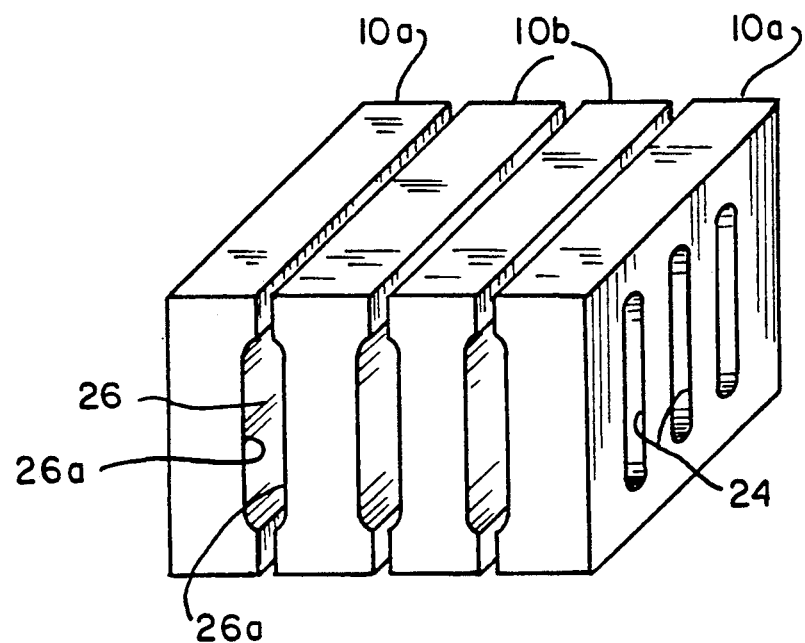
FIG. 13 is a perspective view showing a horn assembled from respective machined plate stock sections prior to welding.

FIG. 13 illustrates the assembly of the sections machined as described heretofore in connection with FIGS. 2 to 12. The horn is assembled from juxtaposed sections prepared individually. As seen, there are, for example, two end sections 10a and two central sections 10b, and slots 26 formed as a result of the recessed portions 26a. Also the slots 24 penetrate through each section and are aligned with one another to form slots all the way through the horn body.

Subsequently, the sections 10a and 10b are welded together at their abutting surfaces by electron beam welding or laser beam welding to form a unitary body. After welding, stress relieving may be required, such as by annealing. After annealing several final steps include the drilling and tapping of the hole 28, insertion of a stud, removing any exposed weld bead, cleaning up of slot ends, if desired, by using an end miller, and fine tuning of the horn to its predetermined high frequency by adjusting the distance between the input surface 12 and the output surface 14.

It will be apparent that several modifications in the procedure described above can be made without deviating from the invention. For instance, the cross slots 24 shown in FIGS. 9 to 12 can be provided in the respective bar 30 or 30a prior to cutting the bars into appropriate sections as shown in FIG. 8. Moreover, when a sufficiently large quantity of horns are to be manufactured, bar stock, especially aluminum or steel, can be obtained in extruded form with recesses 26a present, thus obviating this machining step.

Figure 14:
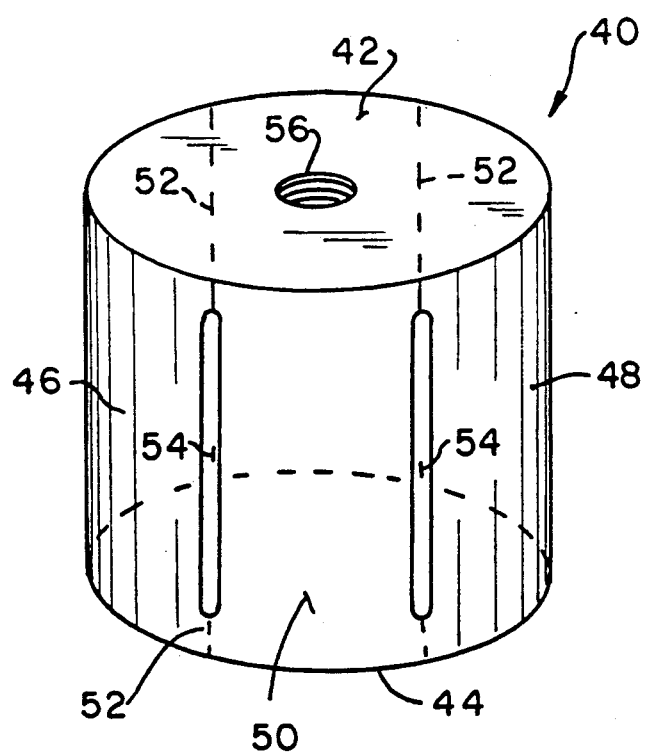
FIG. 14 is a perspective view of a cylindrical horn made in accordance with the teachings of this invention.

FIG. 14 depicts a cylindrical horn made in accordance with the teachings of the present invention. The horn 40 as shown is dimensioned to be resonant as a half wavelength resonator at the predetermined frequency between the input surface 42 and output surface 44. As shown, the horn is made from three juxtaposed sections, namely two end sections 46 and 48 and a central section 50, welded together along abutting surfaces which are indicated by dashed lines 52. A plurality of slots 54 are provided and each section 46, 48 and 50 is provided with a recess which constitutes essentially a half slot as previously illustrated and described. When the sections 46, 50 and 48 are placed into juxtaposed relationship, full slots 54 result. Again, the sections 46, 48 and 50 can be machined individually with the surface receiving the recessed portion, forming a part of the internal slot, fully accessible so that this surface can be machined and polished to eliminate tool marks. A threaded hole 56 is provided for receiving a threaded stud for mechanically coupling the horn to an electroacoustic converter. As stated above, the sections 46, 48 and 50 can be fabricated from readily available bar stock. If additional slots are to be provided on the horn 40, the horn will comprise, quite obviously, a greater quantity of individual sections, all welded together by laser or electron beam welding along abutting surfaces. Moreover, the sections 46, 48 and 50 can be provided with additional slots using conventional milling tools, but since these sections are of smaller thickness than a complete horn, the slotting process is greatly simplified.

Equipment for laser beam welding is available from Hamilton Standard, Hartford, CT, and a machine rated 7.5 kW, 150 kV has been found suitable. Similarly, machines for laser beam welding are available from Coherent, Inc., Auburn, CA, model Everlase rated 3 kW.

While there have been described and illustrated a preferred embodiment of the invention and certain modifications thereof, it will be apparent to those skilled in the art that various further changes and modifications may be made therein without departing from the broad principle of this invention, which shall be limited only by the scope of the appended claims.

What is claimed is:

1. A horn dimensioned to be mechanically resonant as a half wavelength resonator for high frequency waves of a predetermined frequency travelling longitudinally therethrough from an input surface to an oppositely disposed output surface, said horn comprising a plurality of juxtaposed sections welded together.

2. A horn dimensioned to be mechanically resonant as set forth in claim 1, each of said sections including a portion of said input surface and a portion of said output surface.

3. A horn dimensioned to be mechanically resonant as a half wavelength resonator for high frequency waves of a predetermined frequency travelling longitudinally therethrough from an input surface to an oppositely disposed output surface, said horn comprising: a plurality of juxtaposed sections welded together, each section including a portion of said input surface and a portion of said output surface, and a plurality of slots extending through said horn for interrupting Poisson couplings as said waves travel from said input surface to said output surface.

4. A horn as set forth in claim 3, said horn being of substantially rectangular shape, and said plurality of slots comprising a first plurality of slots and a second plurality of slots disposed substantially at a right angle to said first plurality of slots, said slots traversing the body of said horn.

5. A horn as set forth in claim 3, said horn being of cylindrical shape.

6. A horn as set forth in claim 3, said sections being made from titanium metal.

7. A horn as set forth in claim 3, said sections being made from aluminum metal.

8. A horn as set forth in claim 3, said horn being made from steel.

9. A horn as set forth in claim 3, said sections being welded together at their abutting surfaces by electron beam welding.

10. A horn as set forth in claim 3, said sections being welded together at their abutting surfaces by laser beam welding.

11. A horn as set forth in claim 3, each section being of substantially rectangular shape, and each of said sections having a recessed portion in one of its side surfaces, said recessed portion forming with a respective recessed portion in the side surface of a juxtaposed section one of the respective slots of said plurality of slots.

12. A horn as set forth in claim 3, each section being of substantially rectangular shape, and at least one of said sections forming a central horn section having a recessed portion in two of its opposite side surfaces, such recessed portions forming with respectively recessed portions of juxtaposed sections two of the respective slots of said plurality of slots.

13. A horn as set forth in claim 3, said plurality of sections comprising two end sections and at least one central juxtaposed between said end sections; said central section having a recessed portion in each of its side surfaces which are in juxtaposition with the respective end sections, and each of said end sections having a recessed portion in one of its side surfaces which is in juxtaposition with a respective side surface of a central section, whereby said recesses between two juxtaposed sections form a respective slot of said plurality of slots.

14. A horn as set forth in claim 13, and an additional plurality of slots disposed and extending through the sides of each of said sections for forming a second plurality for slots through said horn, said second plurality of slots being disposed at substantially right angles to the slots formed by said recesses in two respectively juxtaposed sections.

15. The method of manufacturing a horn dimensioned to be mechanically resonant as a half wavelength resonator for high frequency waves of a predetermined frequency travelling longitudinally therethrough from an input surface to an oppositely disposed output surface comprising: providing a plurality of horn sections; disposing said sections in juxtaposition, and joining said sections by welding said sections at their abutting surfaces for providing a unitary horn body.

16. The method of manufacturing a horn as set forth in claim 15, each of said sections including a portion of said horn input surface and a portion of said horn output surface.

17. The method of manufacturing a horn as set forth in claim 16, said plurality of sections comprising two horn end sections and at least one central horn section, and disposing said central section between said end sections.

18. The method of manufacturing a horn dimensioned to be mechanically resonant as a half wavelength resonator for high frequency waves of a predetermined frequency travelling longitudinally therethrough from an input surface to an oppositely disposed output surface comprising: providing a plurality of substantially rectangular horn sections in which two horn sections form respective end sections and at least one section forms a central section and each of said sections including a portion of said horn input surface and a portion of said horn output surface; providing in each of said sections a recessed portion in at least one of its side surfaces for forming with a respective recessed portion in the side surface of a juxtaposed section a slot for interrupting Poisson couplings in said horn as said waves travel from said input surface to said output surface; disposing said sections in abutting relation along their side surfaces with said central section disposed between said end sections, and joining said sections by welding said sections at their abutting surfaces for providing a unitary horn body.

19. The method of manufacturing a horn as set forth in claim 18, and providing in sections constituting a central section a recessed portion in each of its side surfaces for forming with recessed portions of juxtaposed sections respective slots.

20. The method of manufacturing a horn as set forth in claim 19, and providing an additional plurality of slots extending through the sides of each of said sections for forming a second plurality of slots disposed at right angles to the slots formed by said recesses in respectively juxtaposed sections.

21. The method of manufacturing a horn as set forth in claim 18, said welding comprising electron beam welding.

22. The method of manufacturing a horn as set forth in claim 18, said welding comprising laser beam welding.

23. The method of manufacturing a horn as set forth in claim 18, said sections being machined from bar or plate stock.

24. The method of manufacturing a horn as set forth in claim 18, said plurality of horn sections comprising a pair of end sections and a plurality of center sections disposed in juxtaposition between said end sections.

25. The method of manufacturing a horn dimensioned to be mechanically resonant as a half wavelength resonator for high frequency waves of a predetermined frequency travelling longitudinally therethrough from an input surface to an oppositely disposed output surface comprising:

providing an elongated first bar having a certain length, width and thickness and providing in one side surface of said first bar a recess along the longitudinal axis of said first bar, said recess forming a part of a slot;

providing an elongated second bar having a certain length, width and thickness and providing in two opposite side surfaces of said bar a respective recess along the longitudinal axis of said bar, each of said recesses forming a part of a slot;

cutting said first bar into sections of predetermined length, said sections forming end sections of the horn;

cutting said second bar into sections of predetermined length, said sections forming center sections of the horn;

providing a plurality of spaced slots through the thickness of said sections forming said end sections and a plurality of like spaced slots through the thickness of at least one section forming a center section, said spaced slots being disposed substantially at ninety degrees to the longitudinal axis of said respective bar sections;

assembling at least one center section and two end sections in juxtaposition, causing the center section to be disposed between said end sections, whereby said recesses form longitudinal slots and said spaced slots form transverse slots through the assembled sections, and welding said center section and said end sections along abutting surfaces for providing a unitary horn body.

26. The method of manufacturing a horn as set forth in claim 25, and assembling a plurality of center sections in juxtaposition between respective end sections.

27. The method of manufacturing a horn as set forth in claim 24, the width of said first bar and that of said second bar approximating the distance between said input surface and said output surface.

28. A horn dimensioned to be mechanically resonant, as a half wavelength resonator for high frequency waves of a predetermined frequency travelling longitudinally therethrough from an input surface to an oppositely disposed output surface, said horn comprising: a plurality of juxtaposed sections welded together; said horn including also plurality of slots through its center portion between said input surface and said output surface for interrupting Poisson couplings, and each section having at least one surface forming a part of a respective slot.

* * * * *